United States Patent
Yamamoto

(10) Patent No.: US 10,733,009 B2
(45) Date of Patent: Aug. 4, 2020

(54) INFORMATION PROCESSING APPARATUS AND INFORMATION PROCESSING METHOD

(71) Applicant: FUJITSU LIMITED, Kawasaki-shi, Kanagawa (JP)

(72) Inventor: Masao Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 192 days.

(21) Appl. No.: 15/968,785

(22) Filed: May 2, 2018

(65) Prior Publication Data
US 2018/0336057 A1 Nov. 22, 2018

(30) Foreign Application Priority Data
May 16, 2017 (JP) .................................. 2017-096998

(51) Int. Cl.
*G06F 9/455* (2018.01)
*G06F 11/30* (2006.01)

(52) U.S. Cl.
CPC ........ *G06F 9/45558* (2013.01); *G06F 11/301* (2013.01); *G06F 2009/45583* (2013.01); *G06F 2009/45591* (2013.01)

(58) Field of Classification Search
CPC ....... G06F 9/45558; G06F 2009/45583; G06F 2009/45591; G06F 11/301
USPC .......................................................... 718/1
See application file for complete search history.

(56) References Cited

U.S. PATENT DOCUMENTS

| 7,644,312 B2 * | 1/2010 | Hind ..................... G06F 11/366 714/38.14 |
| 8,010,849 B2 * | 8/2011 | Butcher .............. G06F 11/3664 714/46 |
| 8,208,381 B2 * | 6/2012 | Kannan ................ G06F 11/079 370/241 |
| 8,645,764 B2 * | 2/2014 | Inamdar ............. G06F 11/0787 709/223 |

(Continued)

FOREIGN PATENT DOCUMENTS

| JP | 2009-223451 | 10/2009 |
| JP | 2010-134557 | 6/2010 |

(Continued)

*Primary Examiner* — Ryan D. Coyer
(74) *Attorney, Agent, or Firm* — Fujitsu Patent Center

(57) ABSTRACT

An information processing apparatus includes a first processor and a second processor. The first processor executes a virtualization program for activating a virtual machine on the first processor. The first processor acquires operation information at a predetermined sampling cycle while executing a program in the virtual machine. The first processor creates key information for aggregating the operation information based on an identifier or register value included in the acquired operation information. The second processor calculates an aggregation value of the key information by aggregating the acquired operation information in accordance with the created key information. The second processor outputs, when the aggregation value of the key information satisfies a predetermined condition, the identifier or register value included in the key information in association with a name identifier defined in the virtualization program or the program executed in the virtual machine together with the aggregation value of the key information.

7 Claims, 10 Drawing Sheets

(56) References Cited

U.S. PATENT DOCUMENTS

| | | | |
|---|---|---|---|
| 9,015,714 B2 * | 4/2015 | Vittal | ................... G06F 9/5072 718/1 |
| 2009/0235056 A1 | 9/2009 | Hirai et al. | |
| 2014/0149980 A1 * | 5/2014 | Vittal | ................... G06F 9/5072 718/1 |
| 2014/0259011 A1 | 9/2014 | Tashiro et al. | |

FOREIGN PATENT DOCUMENTS

| | | |
|---|---|---|
| JP | 2011-150736 | 8/2011 |
| JP | 2014-170482 | 9/2014 |

* cited by examiner

FIG. 7

| NAME | size | DESCRIPTION |
|---|---|---|
| Host IP | 8 | INSTRUCTION POINTER ON HOST |
| Host Thread ID | 4 | CURRENT THREAD ID |
| Host PID | 4 | CURRENT PROCESS ID (=USED AS VMID) |
| Host Return IP1 | 8 | RETURN INSTRUCTION POINTER 1 ON HOST |
| Host Return IP2 | 8 | RETURN INSTRUCTION POINTER 2 ON HOST |
| TSC | 8 | TIME STAMP |
| vPROCESSOR ID | 8 | ID of a virtual CPU |
| Guest IP | 8 | INSTRUCTION POINTER ON GUEST |
| Guest CR3 | 8 | PAGE TABLE ADDRESS ON VM |
| VMEXIT REASON | 8 | VM EXIT FACTOR NUMBER |

INFORMATION PROCESSING APPARATUS AND INFORMATION PROCESSING METHOD

CROSS-REFERENCE TO RELATED APPLICATION

This application is based upon and claims the benefit of priority of the prior Japanese Patent Application No. 2017-096998, filed on May 16, 2017, the entire contents of which are incorporated herein by reference.

FIELD

The embodiment discussed herein is related to an information processing apparatus and an information processing method.

BACKGROUND

In order to calculate, for example, a utilization rate or an occupation rate (hereinafter, referred to as frequency information) of a processor such as a central processing unit (CPU) when an information processing apparatus executes a program in the processor, operation information of the processor is collected at a predetermined cycle. The collected operation information is analyzed and, for example, the utilization rate of the processor by a program or a function in the program or the occupation rate between the programs when a resource is used or between the functions in the program is calculated. In order to calculate such frequency information, a program called a profiler is executed by the processor. Further, there has been provided a technique capable of detecting a problem affecting the performance of the information processing apparatus during the operation thereof based on the calculated frequency information. In addition, the technique of the profiler is also used in a system having a virtual machine environment.

Related technologies are disclosed in, for example, Japanese Laid-Open Patent Publication No. 2009-223451, Japanese Laid-Open Patent Publication No. 2011-150736, and Japanese Laid-Open Patent Publication No. 2010-134557.

SUMMARY

According to an aspect of the present invention, provided is an information processing apparatus including at least one first memory, at least one first processor respectively coupled to the at least one first memory, a second memory, and a second processor coupled to the second memory. The first processor is configured to execute a virtualization program for activating one or more virtual machines on the first processor in accordance with an instruction stored in the first memory. The first processor is configured to acquire operation information at a predetermined sampling cycle while executing a program in the one or more virtual machines. The first processor is configured to create key information for aggregating the operation information based on one or more identifiers or register values included in the acquired operation information. The second processor is configured to calculate an aggregation value of the key information by aggregating the acquired operation information in accordance with the created key information. The second processor is configured to output, when the aggregation value of the key information satisfies a predetermined condition, the one or more identifiers or register values included in the key information in association with a name identifier defined in the virtualization program or the program executed in the one or more virtual machines together with the aggregation value of the key information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 7 is a diagram illustrating sampling data used for analysis;

DESCRIPTION OF EMBODIMENT

In the system having the virtual machine environment, since it takes more time for processing of analyzing the collected operation information than for processing of collecting the operation information of the processor, the processing of collecting the operation information of the processor and the processing of analyzing the operation information may not be temporally overlapped in parallel to be continuously executed in a balanced manner.

Hereinafter, an information processing apparatus according to an embodiment will be described with reference to the drawings. A configuration of the following embodiment is an example and the information processing apparatus is not limited to the configuration of the embodiment. Hereinafter, a comparative example will be described first and, then, the embodiment will be described as an improvement of the comparative example.

Comparative Example

Figure 1:
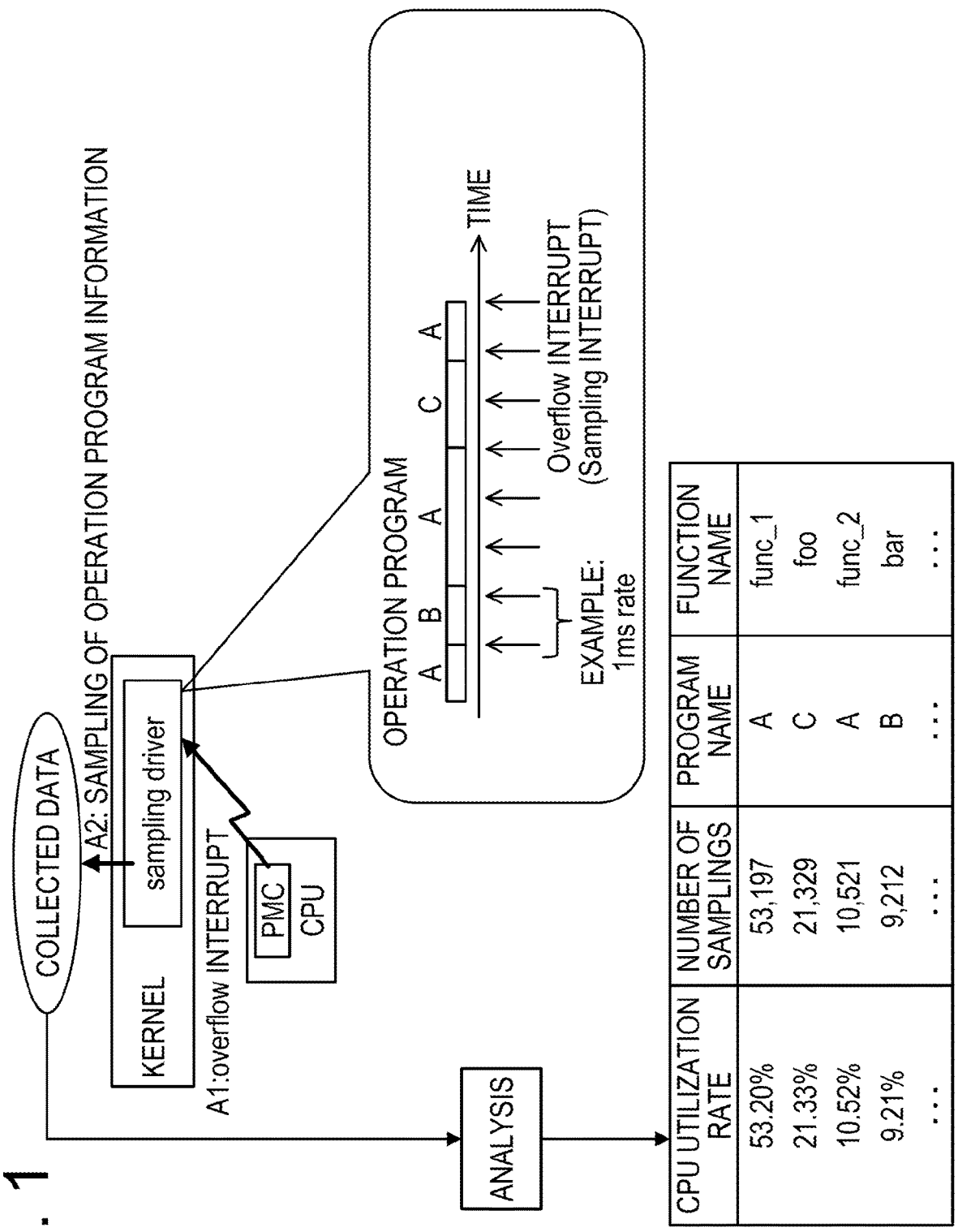
FIG. 1 is a diagram illustrating a configuration of a computer for performing sampling and performance analysis of a performance event of the computer.

FIG. 1 illustrates a configuration of a computer for performing sampling and performance analysis of a performance event of the computer according to a comparative example. Herein, the performance event may be information indicating the state of a resource of the computer acquired from the computer or information indicating the execution of various processing of the computer in order to monitor the performance of the computer. Examples of the performance events may include completion of one cycle of a CPU, completion of instruction execution of the CPU, cache miss, and page fault. As a result of the sampling of the performance event, for example, the utilization rate of the CPU, the number of execution instructions, the number of times of cache miss, and the number of times of page fault are acquired.

For example, the CPU utilization rate for each function of each program executed on the computer is acquired as follows. For example, the CPU includes a register called a performance monitoring counter (PMC). Further, the CPU includes a register for setting a type of an event monitored by the PMC and a counter upper limit value. When the counter of the PMC exceeds a set upper limit value, an overflow interrupt occurs. Since a sampling driver in the OS kernel is activated by the overflow interrupt, the sampling driver may collect various information at the activated timing such as, for example, an ID of a process being executed, a program counter which is a memory address of an instruction being executed (hereinafter, referred to as an instruction address), and values of other registers. The sampling driver stores the collected information (referred to as collected data) in a main memory. In this manner, each time the overflow interrupt occurs, for example, the ID of the process being executed, the instruction address under execution, and other register values are collected.

Further, by using hardware timer interrupt, it is possible to identify a problem site of the program by sampling a program counter (PC) on a time basis. In the processing using the hardware timer interrupt, it is possible to detect a site where a problem occurs in the program, but information regarding, for example, an event by which the problem occurs is not provided. Meanwhile, by using the PMC, the type of the event that may be related to a cause causing the problem is identified together with the problem site due to the program counter.

In FIG. 1, the processing of analyzing the CPU utilization rate for each program based on the collected information is also illustrated. Herein, it is assumed that programs A, B, and C are in operation in the CPU. Further, it is assumed that the overflow interrupt occurs every 1 ms. Then, the sampling driver is activated at the timing of each arrow marked as the overflow interrupt (sampling interrupt) in FIG. 1, and the ID of the process being executed and the instruction address (e.g., a program counter value) are collected. When the ID of the process being executed and the instruction address may be identified, the function being executed or the instruction being executed may be identified from an execution format (binary file) of the program being executed in the process. Therefore, when the information collected by the sampling driver is collected, as illustrated in a table of FIG. 1, the sampling number of events, for example, the CPU utilization rate is acquired for each function of each program. Herein, the utilization rate of the CPU may be a ratio of a CPU occupation time in a plurality of programs to a collection period of collected data. Further, for example, the number of execution instructions and the number of cache misses may also be acquired in the same order as described above. In addition, information indicating a breakdown of performance information as in the table of FIG. 1 is called a profile. Herein, the breakdown may include, for example, the breakdown for each CPU in an information system, the breakdown for each process of each CPU, and the breakdown for each function of each process of each CPU.

An analysis support tool called a performance profiler (hereinafter, simply referred to as a profiler) is provided in order to efficiently identify an abnormal site by analyzing a collection result of the acquired performance event. The performance profiler provides and displays execution ratio information (profile) as described above in process units and function units.

The profiler performs data collection (sampling measurement) at an interval of, for example, 1 millisecond for 60 seconds in an environment where a problem may occur, and performs statistical analysis based on sampling data. In addition, the profiler uses a time series analysis method for "grasping behavior changes" and "discovering intermittent troubles" of applications.

However, in a non-virtualized environment, one OS environment operates in one physical machine. For the non-virtualized environment, a virtualized environment that is based on a computer system called cloud is used. In the virtualized environment, a plurality of virtual machines (VM) and a plurality of operating system (OS) environments operate on one physical machine, and the virtualized environment is configured by a complex and large-scale environment. For that reason, detection of performance anomaly in the cloud and identification of the problem site (hotspot) on running software become more difficult than the detection of the performance anomaly and the identification of the problem site in the non-virtualized environment.

In addition, since the plurality of VMs share the same physical resource, an anomaly factor may be caused by the interference from other VMs. Therefore, at the time of problem investigation, the anomaly has disappeared, and thus, the investigation itself may not be performed in some cases. That is, because it is difficult to reproduce the problem, the investigation itself may not be performed and it may take time to resolve the problem.

Figure 2:
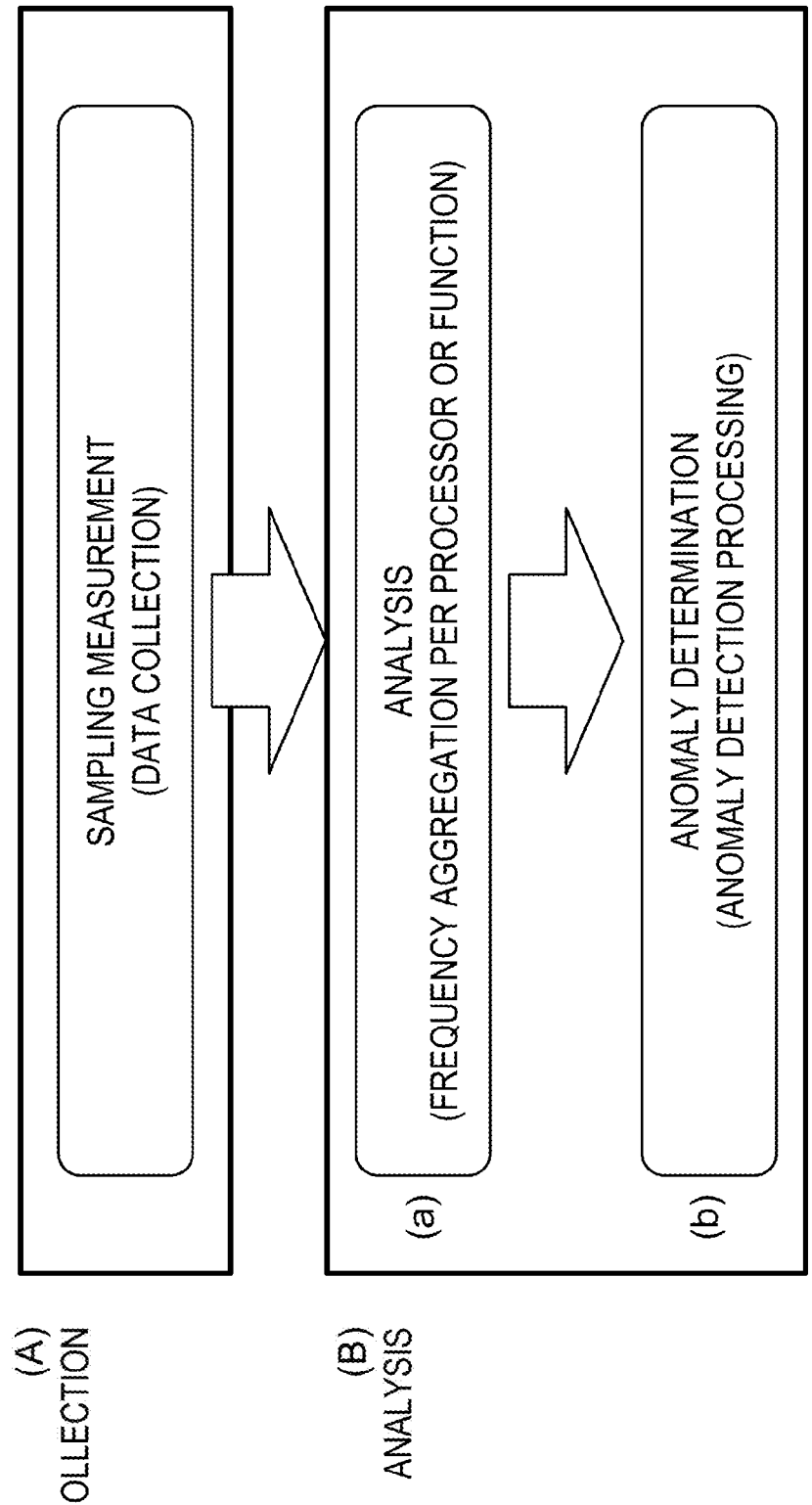
FIG. 2 is a diagram illustrating continuous profile processing in a computer system.

FIG. 2 is a diagram illustrating a continuous profile processing in the computer system. In the processing, sampling measurement (data collection, hereinafter referred to as collection (A)), analysis of sampled data, and anomaly determination (hereinafter referred to as analysis (B)) are continuously and repeatedly executed. Herein, the analysis of the sampled data includes, for example, frequency aggregation in the unit of the process of executing the program or the function unit in the program. Further, the anomaly determination is also called anomaly detection and refers to determining that predetermined anomaly is occurring in the computer system, based on the result of frequency aggregation. In addition, although "collection (A)" is executed by an under-measurement machine, but the processing of "analysis (B)" may be executed by a dedicated machine. Accordingly, "collection (A)" and "analysis (B)" may be executed in parallel.

Figure 3:
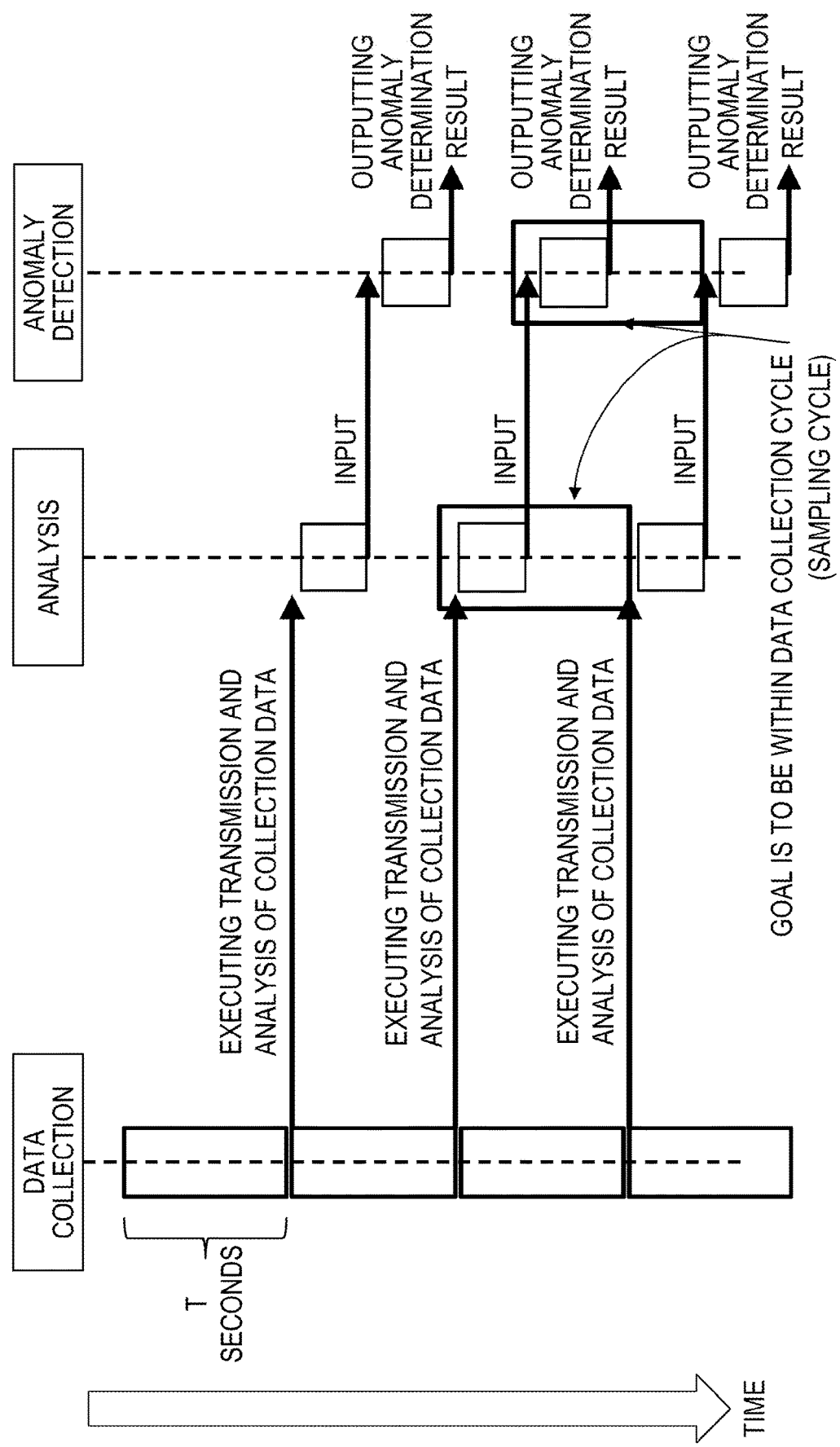
FIG. 3 is a diagram illustrating a flow of processing when data collection, analysis, and anomaly detection are executed in parallel.

FIG. 3 illustrates the flow of processing when data collection, analysis, and anomaly detection (output of a result of anomaly determination) are executed in parallel. In order to periodically execute the process of FIG. 3 repeatedly without delay, with respect to the sampling period (e.g., T seconds) for data collection, it is a goal to execute analysis and anomaly detection within the sampling period.

Measurement Result Example

Hereinafter, actual measurement values of the sampling period for the data collection and processing time of the analysis and anomaly detection will be exemplified.

(1) Herein, the sampling data is sampled in a period of 1 ms for 30 seconds. That is, the time of collection (A)" is 30 seconds.

(2) Time series analysis with time division per 100 ms is performed. That is, there are opportunities for 300 calculations in 30 seconds.

(3) In such a processing example, an entry to be an object of which profile is to be generated is the function and the number of entries is 100.

(4) As for the CPU and the OS, CPU: Intel (registered trademark) Xeon (registered trademark) E5-2697v3 (2.60 GHz), 14 cores, and OS: CentOS Linux (registered trademark) release 7.2 64 bits (kernel3.10.0-327.18.2.el7.x86_64).

(5) With respect to only the analysis processing time during the analysis and anomaly determination time (the time of "analysis (B)"), the analysis processing time for a host OS (or hypervisor) environment on the physical machine is approximately 8 seconds, and the analysis processing time for one guest OS environment on the virtual machine is 4 seconds. Accordingly, in a case in which 20 virtual machines are activated in one physical machine, only the analysis time during the time of "analysis (B)" is roughly 8+4*20=88 seconds. Further, as the number of virtual machines increases, the analysis time increases. Therefore, according to the normal analysis and anomaly detection method illustrated in FIG. 1, it is difficult to perform the data collection, analysis, and anomaly detection (output of the result of the anomaly determination) illustrated in FIG. 3 in parallel without delay.

Alternatives

Therefore, it is conceivable to analyze only a profile result of the host OS (or the hypervisor of the host machine) as a representative without analyzing the sampling data on the virtual machine. Then, since the requirement of the processing time may be satisfied, it is possible to perform the data collection, analysis, and anomaly detection (output of the result of the anomaly determination) illustrated in FIG. 3 in parallel without delay. In addition, it is possible to detect (observe) even the anomaly due to the interference from other VMs (abnormal CPU utilization rate of other VMs) with respect to a predetermined VM. However, it is impossible to detect the anomaly closed in the VM because the anomaly may not appear at a host level.

For example, even when the physical CPU utilization rate of VM-A seen from the host level is constant at 30% for a predetermined VM-A, a failure may occur in the VM-A, in which function A different from a normal state 100% monopolizes the virtual CPU of the VM-A.

Solution to Problem in Processing According to Comparative Example

Therefore, it is necessary to implement the analysis processing that reflects a behavior of the program in the virtual machine and satisfies the requirement of "analysis time<collection time."

Embodiment

Figure 4:
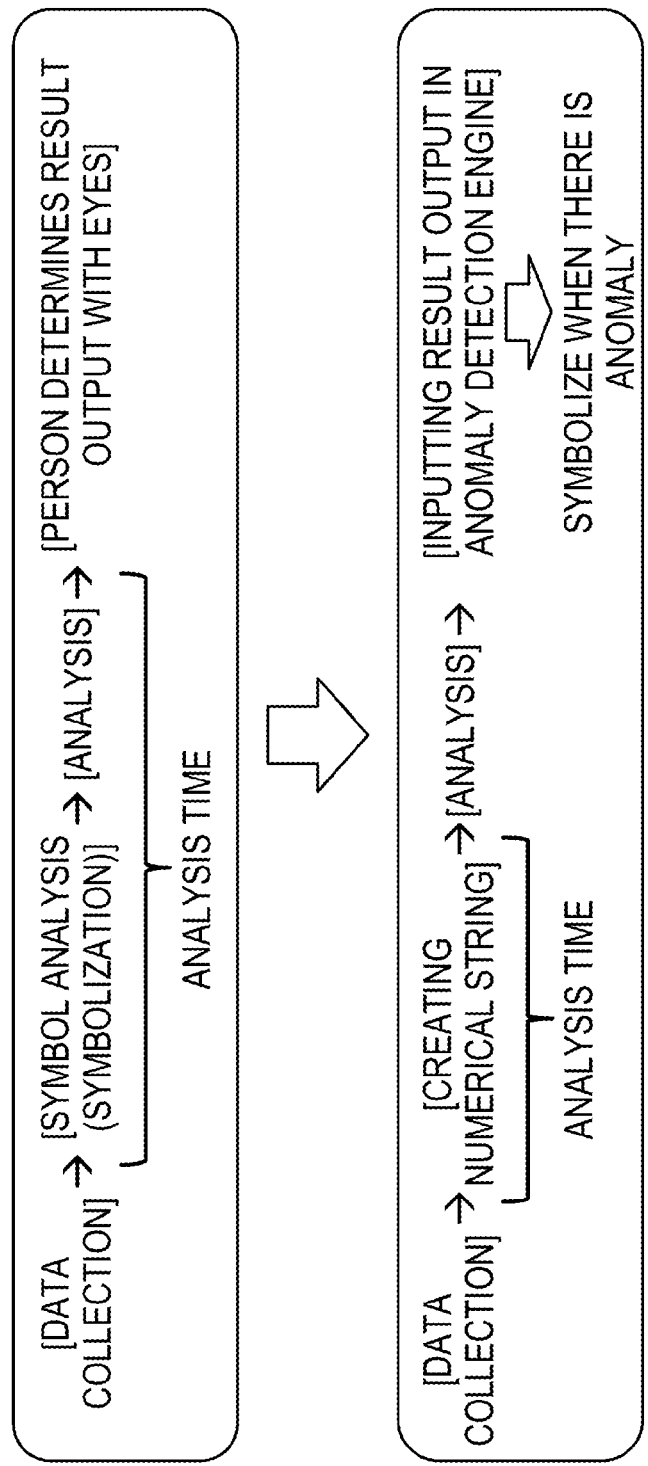
FIG. 4 is an explanatory diagram comparing processing according to a comparative example and processing according to an embodiment.

Hereinafter, an information processing apparatus according to an embodiment will be exemplified with reference to FIGS. 4 to 10. FIG. 4 is an explanatory diagram comparing processing according to a comparative example and processing according to an embodiment. The flow on an upper side of FIG. 4 exemplifies the processing by the profiler in the comparative example, and the flow on a lower side exemplifies the processing by the profiler in the embodiment. The profiler of the present embodiment includes a sampling program and an analysis program. The information processing apparatus executes the following information processing method according to the profiler.

In the processing of the normal profiler which includes the above comparative example, the information processing apparatus carries out symbol resolution (also referred to as symbolization) after the data collection and executes analysis after resolving the symbol. In addition, a person views and determines the output of the analysis result by the information processing apparatus. That is, in the processing of the profiler in the related art, it is assumed that the person views the analysis result to determine whether it is abnormal or not or examine the factor. For this reason, it is premised that the information processing apparatus performs the symbol resolution before executing the analysis, performs the analysis such as frequency aggregation based on the symbol. Herein, the frequency aggregation refers to processing of computing, for example, the occupation ratio of resources such as the CPU among a plurality of programs or among a plurality of functions.

Further, the symbol is a name identifier such as a process name, a program name executed in the process, a function name in the program, or a variable name. The symbol resolution means associating or converting identification information with which the CPU or the OS of the information processing apparatus identifies a processing target, such as a process ID, a register value, and an instruction address, with or into the process name or a name identifier in the program. Herein, in the sampling, since the instruction address is collected from the program counter, the instruction address may also be a register value. The information processing apparatus executes the symbol resolution of the sampling data so that the user of the profiler may determine where the anomaly is, based on the analysis result of the sampling data. However, since the symbol resolution includes, for example, a process of searching a correspondence relationship between the instruction address and the symbol, it takes time to resolve the symbol.

Figure 5:
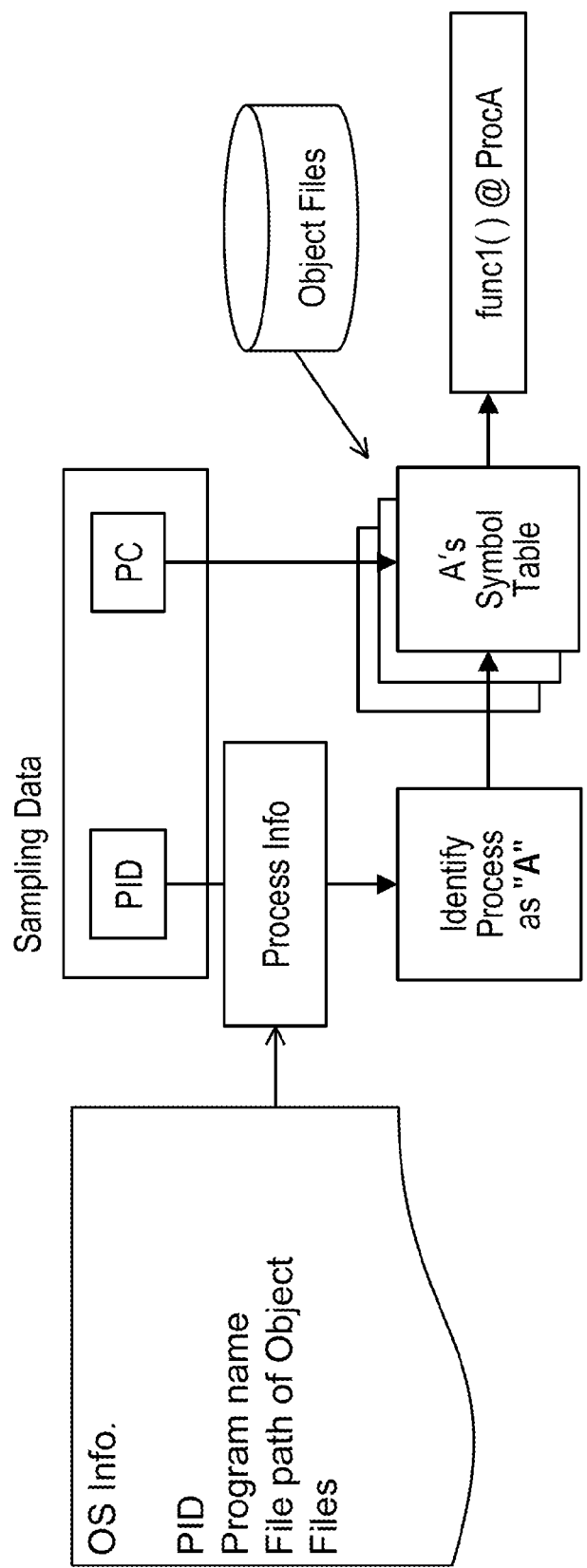
FIG. 5 is a diagram illustrating processing of symbol resolution.

FIG. 5 illustrates the processing of the symbol resolution. Herein, for example, it is assumed that a process identifier (hereinafter, referred to as PID) and the instruction address of the instruction being executed by the CPU are obtained by the profiler executed by the information processing apparatus. In addition, as the symbol resolution, analyzing the profile based on the function is assumed, and a process of identifying the function from the instruction address is exemplified. The profiler acquires PID, a program name, and a file path of an object file of a program in association with each another as OS information (OS info) from the OS. Therefore, the profiler identifies the program name (e.g., program A) from the PID.

Further, the profiler identifies the file path of the object file, that is, an existence location on the file system, from the OS information. Therefore, when the profiler is capable of knowing the PID, the profiler accesses the object file of the corresponding program and acquires a symbol table. In the symbol table, a symbol name (the name such as the function or the variable) and a head address in an object in which the symbol is disposed are disclosed.

Further, in a memory space of the process, the head address in which the program of each object file is disposed is written in a memory map of process information (Process Info). Therefore, the profiler may recognize each symbol, for example, the head address of the function from the head address of the program written in the process information (process Info) and the head address in the object file of each symbol in the symbol table. Meanwhile, an address of an end of each symbol may be grasped as the address immediately before the head address of a next symbol of the corresponding symbol in the symbol table. From the above, when the profiler acquires the sampling data including the PID and the instruction address, the profiler may associate the function name with the instruction address in each sample data.

Meanwhile, in the embodiment, it is not assumed that the person determines all analysis results. For example, when the information processing apparatus mechanically performs the anomaly determination with an anomaly detection engine (software), time-consuming symbolization may not be executed before analysis. Therefore, as exemplified in the flow on the lower side of FIG. 4, the information processing apparatus may symbol-resolve only the analysis result determined to be abnormal by the anomaly detection engine to let the user make the determination. Therefore, in the embodiment, when the information processing apparatus performs an analysis processing, for example, when the information processing apparatus aggregates the sampling data, the information processing apparatus identifies individual sampled data by values such as numerical values and character strings to recognize the information processing apparatus instead of the symbol. In addition, the information processing apparatus groups and aggregates the identified data to calculate a frequency (e.g., occupation rate). The sampling data is substituted into the values such as the numerical value and the character string which may be recognized by the information processing apparatus to become the sampling data of the value of, for example, the substituted character string. In FIG. 4, the sampling data of the value such as, for example, the substituted character string is called a numerical string. Therefore, it becomes a problem that which numerical value is to be used to generate a numerical string, and which aggregation method is to be used, or whether the numerical values should be grouped into units useful for anomaly determination.

Further, in the embodiment, details of the anomaly detection engine are omitted, but a time-series analysis technique and a technique by clustering are proposed as the anomaly detection engine. Further, the present inventor proposes methods using entropy and a Manhattan distance as the anomaly detection engine. However, in the embodiment, there is no limit in a detailed technique of the anomaly detection engine.

In the method using the entropy, for example, the information processing apparatus regards the CPU utilization rate as an occurrence probability of an event occupying the CPU and sets the CPU utilization rate to P(xi) and calculates an expected value (entropy) of an information amount obtained from the occurrence probability. In addition, when there is a change of a reference or more in the entropy in the previous sampled data and the current sampled data, the information processing apparatus may determine that there is a high possibility of anomaly.

Further, similarly, the information processing apparatus calculates the Manhattan distance for the aggregation result of the profiles at different times (CPU utilization rate P(xi) i=1, . . . ). In addition, when there is the change of the reference or more from the current calculated Manhattan distance (the Manhattan distance in the previous sampled data and the current sampled data), the information processing apparatus may determine that there is the high possibility of anomaly.

Configuration

Figure 6:
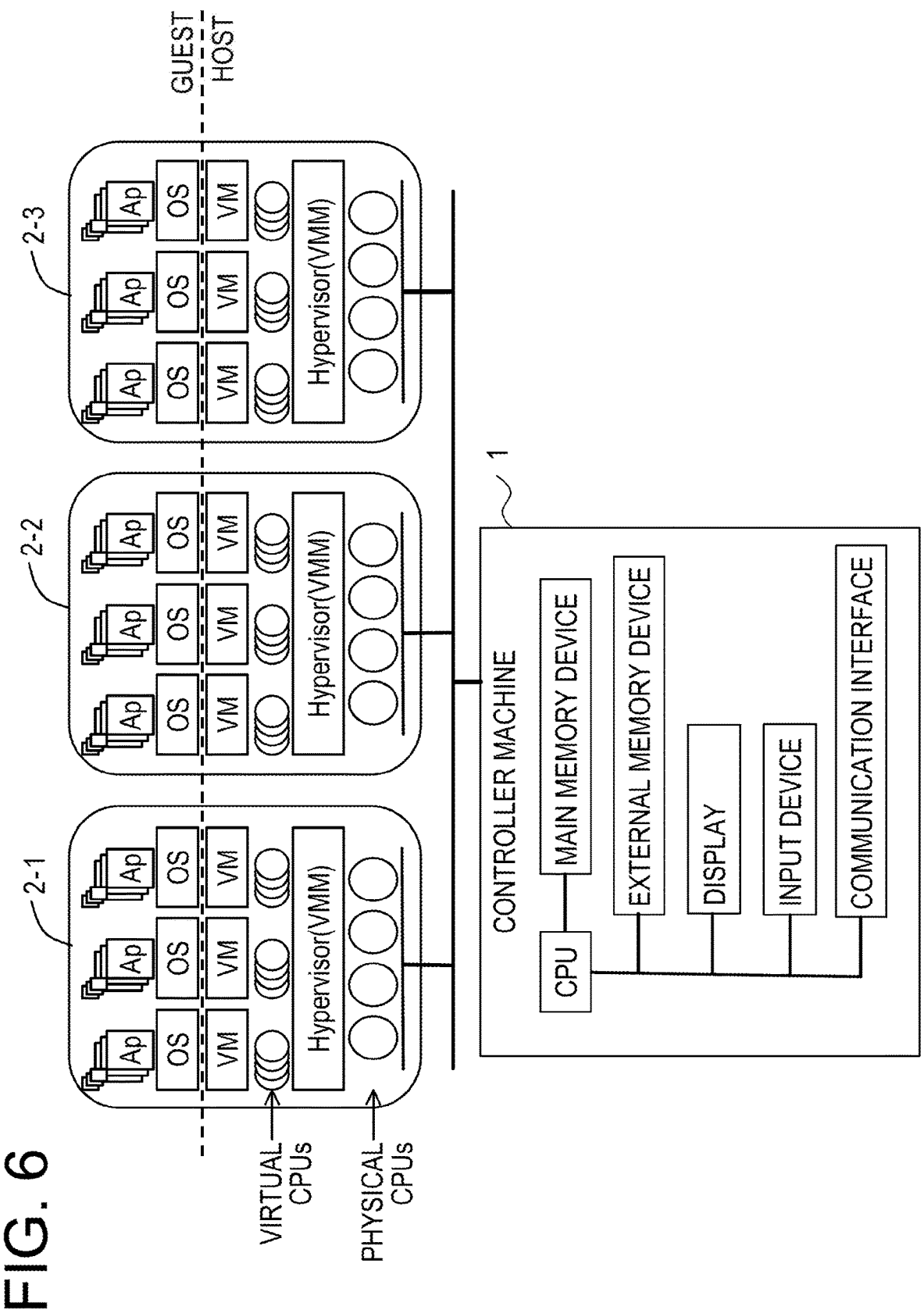
FIG. 6 is a diagram illustrating a configuration of an information processing apparatus of an embodiment.

FIG. 6 illustrates a configuration of an information processing apparatus of an embodiment. The information processing apparatus is a virtual machine system and includes a controller machine 1 and a plurality of host machines 2-1 to 2-3. Further, when host machines 2-1 to 2-3 are collectively called, the host machines are simply referred to as host machine 2. The number of host machines 2 is not limited to three. The host machine 2 is also called a node.

The controller machine 1 monitors and controls the entire information processing apparatus. The controller machine 1 includes, for example, a CPU, a main memory device, an external memory device, a display, an input device, and a communication interface. The CPU of the controller machine executes a computer program expanded in the main memory device and executes processing as the controller machine. The main memory device memorizes the computer program executed by the CPU or data processed by the CPU. The external memory device stores the data processed by the CPU. The display displays, for example, the data processed by the CPU. The input device accepts an operation of the user and inputs the accepted operation to the CPU. The communication interface communicates with, for example, other host machines 2 via a network. In FIG. 6, one controller machine 1 is illustrated, but the controller machine 1 may be a system in which a plurality of computers is associated with each other.

The host machine 2 has a physical CPU. Further, in FIG. 6, hardware other than the CPU of the host machine 2 is omitted, but the host machine 2 has the main memory device, the external memory device, the communication interface, and the like similarly to the controller machine 1. In addition, on the physical CPU of the host machine 2, the hypervisor is executed and a virtual environment is constructed. That is, the hypervisor provides a virtual machine (VM) including a virtual resource such as, for example, a virtual CPU. On each virtual machine, a guest OS (simply described as OS in FIG. 6) is executed, and an application program is executed on the guest OS. However, in the embodiment, the information processing apparatus is not limited to the virtual machine system virtualized by the hypervisor. For example, the information processing apparatus may be the virtual machine system virtualized by the host OS and a virtualization program on the host OS.

The physical CPU (and the CPU of the controller machine 1, hereinafter, the same as above) is also called a microprocessor unit (MPU) or the processor. The physical CPU is not limited to a single processor, but may be a multiprocessor configuration. Further, a single physical CPU connected by a single socket may have a multi-core configuration. At least partial processing of the host machine 2 (or the controller machine 1) may be performed by the processor other than the physical CPU, for example, a dedicated processor such as a digital signal processor (DSP), a graphics processing unit (GPU), a numerical operation processor, a vector processor, or an image processor. Further, at least partial processing of the host machine may be performed by an integrated circuit (IC) or other digital circuit. In addition, an analog circuit may be included in at least a part of the host machine. The integrated circuit includes an LSI, an application specific integrated circuit (ASIC), and a programmable logic device (PLD). The PLD includes, for example, a field-programmable gate array (FPGA). Each part of the physical CPU (and the CPU of the controller machine 1) may be a combination of the processor and the integrated circuit. The combination is called, for example, a microcontroller (MCU), a system-on-a-chip (SoC), a system LSI, or a chip set. The physical CPU of the host machine 2 and the CPU of the controller machine 1 are examples of one or more processors. The physical CPU of the host machine 2 and the CPU of the controller machine 1 may be an example of the processor as one of one or more processors.

Processing Example 1

Hereinafter, sampling data analysis processing by the controller machine according to a first embodiment will be exemplified. In Processing Example 1, exemplified is a processing of analyzing the sampling data collected by the information processing apparatus which is a virtual computer system illustrated in FIG. 6, per process on the virtual machine. In the host machine 2 of this information processing apparatus, the sampling driver in the hypervisor or the OS kernel is activated by the overflow interrupt similarly to the information processing apparatus described in FIG. 1. In addition, the sampling driver collects various information at the activated timing, for example, the PID of the process being executed by the host machine 2 and the address of the memory of the instruction being executed by the host machine 2. In the virtual computer system such as the information processing apparatus, the virtual machine is activated as one process of the host machine. Therefore, the PID of the process being executed in the host machine 2 may be used as the ID of the virtual machine.

In addition, generally, in the virtual computer system, from the viewpoint of security, the hypervisor of the host machine 2 or the process of the host machine 2 may not acquire the information of the process on the virtual machine. However, as disclosed by the present inventor in Japanese Patent No. 6079317 (Japanese Patent Application No. 2013-043158, Japanese Laid-Open Patent Publication No. 2014-170482), the profiler of the host machine 2 may acquire a context of the virtual machine, for example, the value of a control register or the program counter from a context saving area. For example, the CPU made by Intel Corporation runs a program called a virtual machine monitor (VMM), and thereafter, operates the virtual machine. In such a virtual computer system, for example, in the course of execution scheduling of each virtual machine or processing in the virtual machine or hypervisor, a plurality of virtual machines or hypervisors may access the same physical resource. In this case, contents assigned to the physical resource are saved or restored in the context saving area, and as a result, continuity of the processing in each virtual machine is secured.

For this reason, the CPU of the host machine 2 has the context saving area and the control register for controlling the context saving area. For example, the processor manufactured by Intel Corporation has control registers CR0 to CR4. Among the control registers, the register CR3 refers to a physical address of a page directory and holds address information called a page table address. Every time a user process to be executed is switched, the CR3 register is rewritten, and as a result, an extended page table for the process is designated. In addition, when the interrupt processing occurs, the register value of CR3 of the active virtual machine is saved in the context saving area. Furthermore, when the interrupt processing ends and the processing of the original virtual machine is restarted, the register value of CR3 of the context saving area is read again and the process is restarted. Therefore, the value of the register of CR3 may be used as identification information for distinguishing the process on the virtual machine.

Therefore, in the embodiment, the profiler executed by the information processing apparatus executes the following processing. In the embodiment, the profiler includes a sampling program and an analysis program. The host machine 2 executes the sampling program, and the controller machine 1 executes the analysis program.

(1) The host machine 2 executes the sampling program and acquires the PID and the instruction address of the process which operates on the host OS or on the hypervisor of the host machine 2. The processes also include virtual machine processes. One virtual machine corresponds to one process on the host OS or the hypervisor (the virtual machine is administrated by the virtualization program executed by the host OS). Hereinafter, in the embodiment, the virtual machine by the hypervisor is assumed and described, but the configuration of the embodiment may also be applied to the virtual machine by the virtualization program executed by the host OS.

(2) Then, the host machine 2 uses the PID acquired by the host machine 2 as the ID of the virtual machine (hereinafter, referred to as VMID). Further, the host machine 2 uses the CR3 register value (=page table address value) of the guest, as a substitute of the PID of the process executed by the guest OS of the virtual machine.

(3) The controller machine 1 executes the analysis program and aggregates the collected sampling data per process of the guest OS of the virtual machine. The controller machine 1 uses a "connection value of the PID value on the host machine 2 and the register value of CR3 in the virtual machine" as information for identifying the process of the guest OS of the virtual machine. That is, the controller machine 1 performs frequency aggregation (that is, profile analysis for one OS environment) in the connection value and inputs the result to the anomaly detection engine.

(4) In the anomaly detection engine, when the analysis result is determined to be abnormal, the controller machine 1 executes the symbol resolution. That is, in the profile of the frequency aggregation result, the controller machine 1 converts the process ID collected by the host machine or the register value of CR3 collected by the virtual machine into the process name of the host machine 2, the process name or the program name in the virtual machine. That is, the controller machine 1 executes the symbol resolution using "map information of CR3 and PID" and "process information on the guest OS" collected on the virtual machine.

(5) The virtual machine constructed in the host machine 2 executes a symbol map collecting program for collecting a symbol map and operates as a symbol map collecting unit. Then, the symbol map collecting unit creates symbol map information including the "map information of CR3 and PID" and "process information on the guest OS." A processing order of the symbol map collecting unit has already been proposed by, for example, the inventor in Japanese Patent Application No. 2013-043158.

That is, the symbol map information is created for each process of the virtual machine and has a CPU number, a process ID (PID), a page table address, a thread ID, a process name, a function address, and a function name. The symbol map collecting unit acquires the process ID, the page table address, the thread ID, and the process name from an administration area (task structure) that administrates a task created for each process in the virtual machine. In addition, the symbol map collecting unit acquires the function address and the function name from the object file corresponding to the application program.

The controller machine 1 acquires the created symbol map information via the hypervisor of the host machine 2. In order to acquire the symbol map information created by the symbol map collecting unit on the virtual machine, for example, the hypervisor executes a remote copy command identifying the IP address on the virtual machine (e.g., rcp of UNIX (registered trademark) and scp of Linux (registered trademark)). The hypervisor may acquire the symbol map information on the virtual machine by the remote copy command. In addition, the hypervisor may become a network file system (NFS) server of an NFS, and the symbol map information created by the symbol map collecting unit on the guest OS may be recorded in an external memory device such as a hard disk on the hypervisor from the guest OS on each virtual machine.

(Collected Data)

Data collected by the sampling program of the host machine 2 is as follows.

(A) Sampling Data FIG. 7 illustrates sampling data used for analysis. For example, when the sampling data is collected for approximately 60 seconds on the cycle of 1 ms, 60,000 samples are collected per physical machine. The sampling data is an example of operation information acquired at a predetermined sampling cycle when executing the program in one or more virtual machines. As illustrated in FIG. 7, the sampling data includes Host IP (instruction pointer on the host at the time of sampling), Host Thread ID (thread ID of the host at the time of sampling), Host PID (process ID on the host at the time of sampling), Host Return IP1, IP2 (return instruction pointer of the function of the instruction address at the time of sampling), TSC (time stamp), and vPROCESSOR ID (ID of a virtual CPU). The sampling program of the host machine 2 is constituted by a user program section, and the kernel of the host OS or the sampling driver (FIG. 1) incorporated in the hypervisor, and acquires the sampling data in a hypervisor layer (by itself=sampling driver).

The sampling data further includes Guest IP (instruction pointer in a guest on the virtual machine), Guest CR3 (value of CR3 of the virtual machine), and VM EXIT REASON (VM EXIT factor number). The sampling program of the host machine 2 acquires the Guest IP (instruction pointer in a guest on the virtual machine), Guest CR3 (value of CR3 of the virtual machine), and VM EXIT REASON (VM EXIT factor number) from the context saving area of the virtual machine on the host machine 2.

(B) Process information: The process information includes, for example, the process name corresponding to each PID, the memory map (head address of the function on the virtual memory) in the process, and a path name on the file system of the object file.

(C) Object file: The object file includes the function name of each function and a relative address (the address in the object file) of a head location. Such a function name and the relative address of the head location are defined in the symbol table. Therefore, the analysis program of the controller machine 1 may identify the function name from the instruction address in the sampling data based on information obtained by combining the memory map of the process information and the object file with each other.

(D) Symbol map information of the kernel: The symbol map information of the kernel is stored in a predetermined file of the host machine 2. The analysis program of the controller machine 1 may identify, for example, the function used in the kernel from, for example, the instruction address in the kernel by using the symbol map information of the kernel.

(E) Supplementary information such as execution condition and environment information: The sampling program of the host machine 2 acquires an execution environment such as a version of the hypervisor and the resource of the virtual machine (by itself) in the hypervisor layer.

Figure 8:
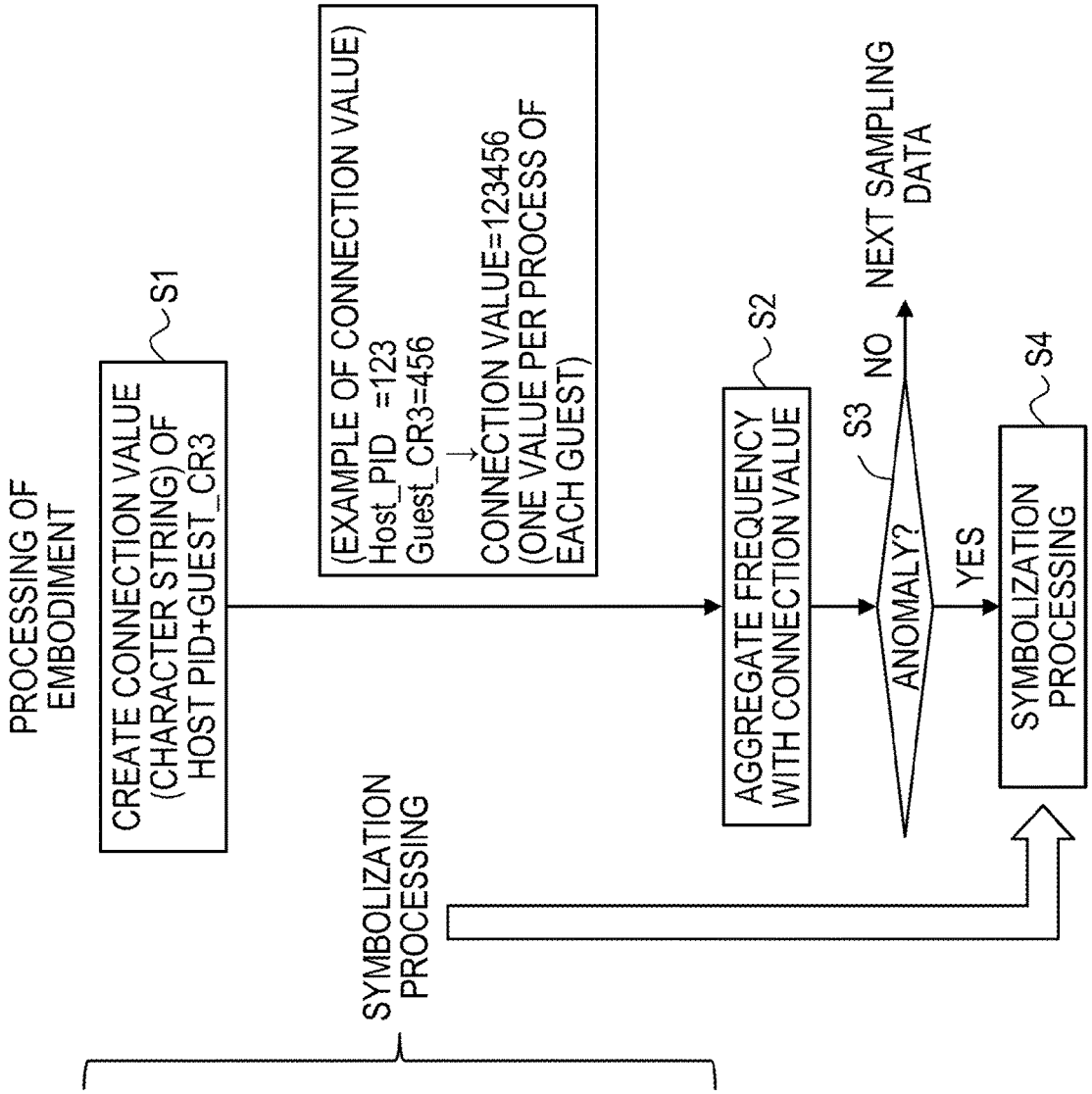
FIG. 8 is a diagram comparing the processing of the comparative example and the processing of the embodiment.

FIG. 8 is a diagram comparing the processing of the comparative example and the processing of the embodiment with each other. In the comparative example, it is described that the profiler performs a sampling and analysis. In the embodiment, for example, in the configuration of FIG. 2, the CPU of the host machine 2 executes the sampling program and collects the sampling data. Further, it is described that the CPU of the controller machine 1 of FIG. 2 executes the analysis program and analyzes the sampling data.

The processing order of the profiler in the comparative example is as follows. The profiler of the comparative example identifies the virtual machine (guest) from the Host PID (C1). Then, the profiler refers to CR3-PID map information of the corresponding virtual machine (guest) and converts Guest_CR3 into PID on the corresponding guest for all sample data (C2). Here, Guest_CR3 may be the value of CR3 of the virtual machine (guest) and may be acquired from the context saving area that saves the context of the virtual machine (guest) in the host machine 2 as described above.

Then, the profiler refers to the process information of the corresponding virtual machine (guest) and converts the PID administrated by the guest OS on the virtual machine (guest) into the process name for all sampled data (C3). Then, the profiler performs frequency aggregation by the process name for each guest (C4). As described above, the profiler of the comparative example presents the process name for each virtual machine (guest) as the occupation ratio of the CPU resource for each process.

Among the processing of the comparative example, processing from C1 to C3 is processing called symbol resolution (symbolization processing) for converting the register value of CR3 of the virtual machine in the sampling data into the process name on the virtual machine (guest). Meanwhile, the flow on the right side of FIG. 8 is processing of the analysis program executed by the controller machine 1 of the embodiment. Hereinafter, the processing executed by the controller machine 1 will be described as the processing executed by the analysis program.

In the embodiment, the analysis program creates a connection value obtained by connecting the value of Host PID which is the process ID administrated by the hypervisor on the host machine 2, and the value of Guest_CR3 which is CR3 on the virtual machine (guest), for example, a character string (S1). In this case, since the Host PID corresponds to the process on the hypervisor, the Host PID is information for identifying the virtual machine (guest) on the host machine 2. Further, the value of Guest_CR3 is a value indicating the physical address of the page directory on the virtual machine (guest) and becomes a value for identifying the user process on the virtual machine (guest). Therefore, the connection value of the value of Host PID and the value of Guest_CR3 is a value uniquely identifying one user process on the virtual machine (guest) on the host machine 2 where one or more virtual machines are constructed. The connection value is an example of key information. The processing of S1 is an example of creating key information.

For example, when Host PID=123 and Guest_CR3=456, the connection value is a character string of 123456. However, the connection value of the value of Host PID and the value of Guest_CR3 need not be the connection value as the character string, but may be a simple combination of bit strings. Further, the connection value of the value of Host PID and the value of Guest_CR3 may be any connection value as long as the connection value may reversibly restore the value of Host PID and the value of Guest_CR3.

In addition, the analysis program aggregates the frequency of the sampling data with the connection value obtained in S1. Briefly, the analysis program aggregates the number of data (the number of samples) of the sampling data corresponding to the connection value, among the sampling data (S2). Then, in the analysis program, whether the anomaly occurs in the host machine 2 is determined from the frequency aggregation result obtained in S2 by the anomaly detection engine (S3). The processing of S2 is an example of calculating the aggregation value of the key information. The processing of S3 is an example of determining whether the aggregation value of the key information satisfies a predetermined condition.

A case where it is determined in S3 that there is the anomaly corresponds to, for example, a case where the frequency aggregation result of a specific user process exceeds a reference value and changes greatly, as compared with the sampling data aggregated up to the previous time. In addition, the case where it is determined that there is the anomaly corresponds to, for example, a case where the frequency aggregation result of the user process whose frequency aggregation value was low ranked up to the previous time exceeds the reference value and occupies a high ranking or a high proportion. There is no limit in the method of determining whether the anomaly occurs, by the anomaly detection engine. For example, the anomaly detection engine may implement a generally performed time series analysis method or a method by clustering. Further, for example, the anomaly detection engine may execute the method using the entropy and the Manhattan distance which the present inventor has already proposed.

In addition, when there is no anomaly, the analysis program executes analysis processing of the next sampling data. Meanwhile, when the anomaly is detected in S3, the analysis program performs the symbol resolution of the value of Host PID and the value of Guest_CR3 used for frequency aggregation in S2, and outputs the symbol-resolved profile to, for example, the display (S4). The case where the anomaly is detected in S3 is an example of a case where the aggregation value of the key information satisfies a predetermined condition. The processing of S4 is an example of associating one or more identifiers or register values included in the key information with a name identifier defined in the program executed in the virtualization program or each of one or more virtual machines, and outputting the corresponding identifiers or register values together with the aggregation value of the key information.

The value of the Host PID and the value of the Guest_CR3 are the process ID of the hypervisor (or the host OS) of the host machine 2 or the register value of the virtual machine, which is a value difficult for the user to understand. However, due to the symbol resolution, the value of the Host PID becomes the process name of the host machine 2, and the value of the Guest_CR3 becomes the process name of the virtual machine. Therefore, the user may determine a specific user process of a virtual machine in which the anomaly state is detected.

Further, in the processing according to the embodiment, the symbol resolution is not performed unless the anomaly is detected. That is, in the processing from S1 to S3 until the anomaly is detected, since the analysis program merely calculates the connection value of the value of the Host PID and the value of the Guest_CR3, the controller machine 1 may sufficiently execute the analysis processing of S1 to S3 rapidly. In addition, when a problem is detected, the controller machine 1 may execute the symbol resolution. Therefore, as compared with the processing of the comparative example (processing on the left side), in the processing (processing on the right side) of the embodiment in FIG. 8, the analysis processing that there is almost no symbol resolution may be executed unless the problem is detected. Therefore, as illustrated in FIG. 3, the information processing apparatus may perform performance analysis and determination that there is no anomaly in the virtual machine environment by balancing a collection time and an analysis time of the sampling data.

Processing Example 2

In the processing example described above, the controller machine 1 aggregates the sampling data with the connection value of the value of the Host PID which is the PID of the host machine 2, and the value of the Guest_CR3 which is the register value of the CR3 on the virtual machine. As a result, the controller machine 1 uniquely identifies the user process on the virtual machine constructed in the host machine 2, aggregates the sampling data, and detects the anomaly of any one user process in any one virtual machine on the host machine 2.

In Processing Example 2, the controller machine 1 aggregates the sampling data by using the connection value of the PID of the host machine 2, the register value of CR3 on the virtual machine, and the instruction address of the virtual machine by the analysis program. The instruction address in the process of the virtual machine of the host machine 2 is uniquely identified by the connection value of the register value of CR3 on the virtual machine and the instruction address of the virtual machine. The controller machine 1 inputs the profile which is the aggregation result with the connection value, to the same anomaly detection engine as Processing Example 1 and executes anomaly detection.

Figure 9:
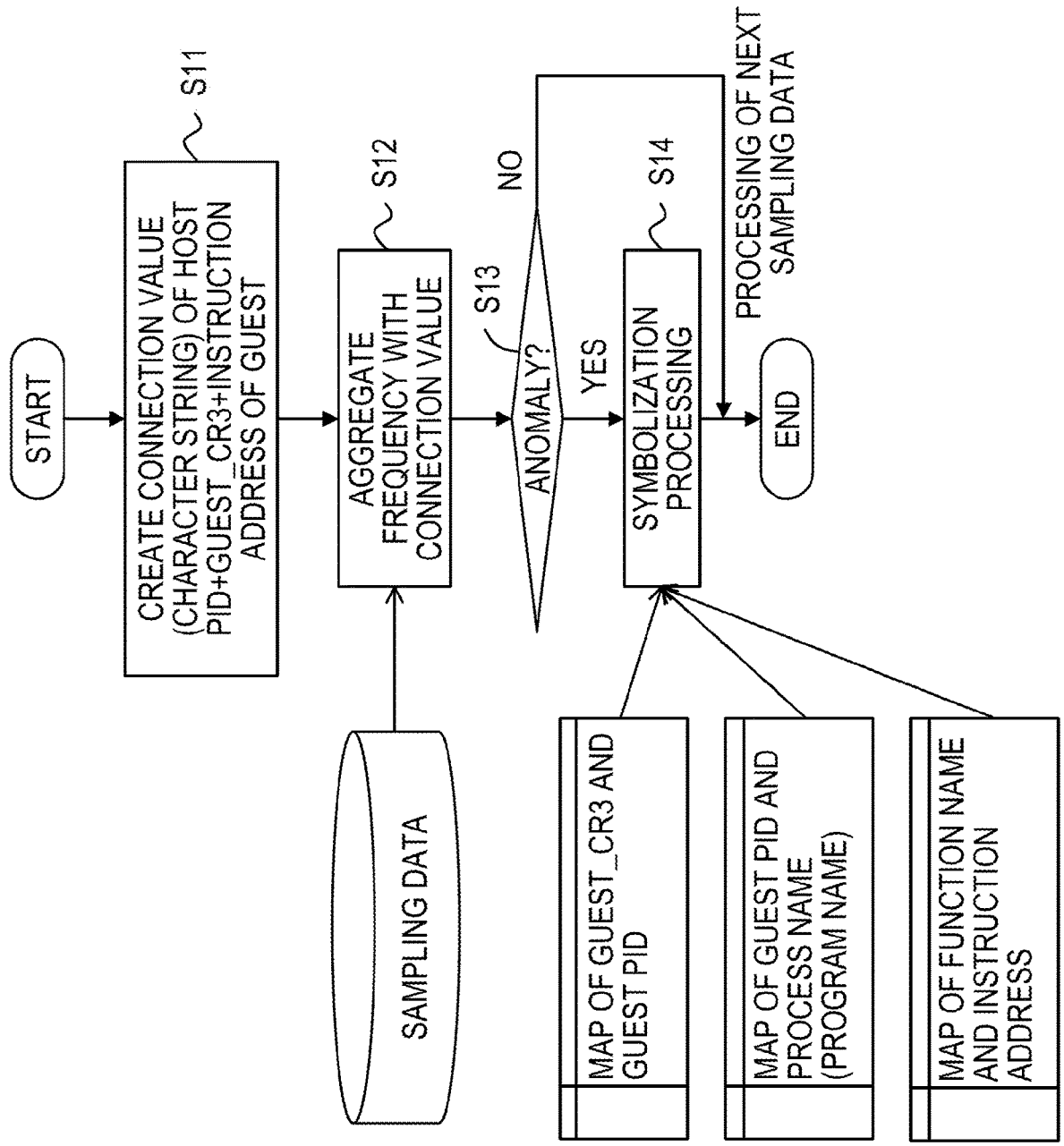
FIG. 9 is a flowchart illustrating processing of an analysis program in Processing Example 2.

FIG. 9 is a flowchart illustrating processing of an analysis program in Processing Example 2. In Processing Example 2, the analysis program creates the connection value acquired by connecting the value of the Host PID, the register value of the Guest_CR3, and the instruction address of the virtual machine (S11). In this case, the connection value is a value for uniquely identifying the instruction address of the program executed by one user process on the virtual machine (guest) on the host machine 2 where one or more virtual machines are constructed. The processing of S11 is an example of creating the key information.

Then, the analysis program aggregates the frequency of the sampling data with the connection value obtained in S11 (S12). Then, in the analysis program, whether the anomaly occurs in the host machine 2 is determined from the frequency aggregation result obtained in S12 (S13). The processing of S12 is an example of calculating the aggregation value of the key information. The processing of S13 is an example of determining whether the aggregation value of the key information satisfies a predetermined condition.

Then, when it is determined that there is no anomaly, the analysis program executes analysis processing of the next sampling data. Meanwhile, when it is determined in S13 that the anomaly is detected, the analysis program performs the symbol resolution of the value of Host PID, the value of Guest_CR3, and the instruction address which have been used for the frequency aggregation in S2, and outputs the symbol-resolved profile to, for example, the display (S14). In S13, the case where the anomaly is detected is an example of a case where the aggregation value of the key information satisfies a predetermined condition. The processing of S14 is an example of associating one or more identifiers or register values included in the key information with a name identifier defined in the program executed in the virtualization program or each of one or more virtual machines and outputting the corresponding identifiers or register values together with the aggregation value of the key information.

For example, the analysis program identifies the PID of the virtual machine from the Guest_CR3 of the virtual machine in the sampling data based on the map of Guest_CR3 acquired from the guest OS of the virtual machine and the PID on the virtual machine. In addition, the profiler identifies the process name of the user process on the virtual machine or the program name executed by the process from the map of the PID and the process name on the virtual machine acquired from the guest OS of the virtual machine. Further, the analysis program associates the instruction address of the sampling data with the function name based on the map of the function name and the instruction address acquired from the object file on the virtual machine. Therefore, in Processing Example 2, when the controller machine 1 detects the anomaly by the anomaly detection engine, the controller machine 1 may execute the symbol resolution and identifies the function on the virtual machine constructed in the host machine 2 to present the problem site.

Processing Example 3

Processing Example 3 exemplifies processing of aggregating the sample data with the connection value obtained by connecting the function ID for identifying the function in the program executed as the process on the virtual machine with the Host PID and the Guest_CR3. Herein, the function ID is information for uniquely identifying the function in the program executed in the virtual machine. In Processing Example 3, the analysis program of the controller machine 1 creates the map of the head address of the function and the ID of the function in the object file of the program in advance. In addition, the analysis program of the controller machine 1 acquires the memory map as the process information from the OS of the virtual machine. Since the memory map indicates the head address of the program (object file) in the process, the analysis program may create the map of the function ID and the instruction address in the process. Therefore, by aggregating the sampling data with the connection value of the Host PID, the Guest_CR 3, and the function ID, the profiler may aggregate the sampling data for each function in the program executed on the virtual machine constructed in the host machine 2.

Figure 10:
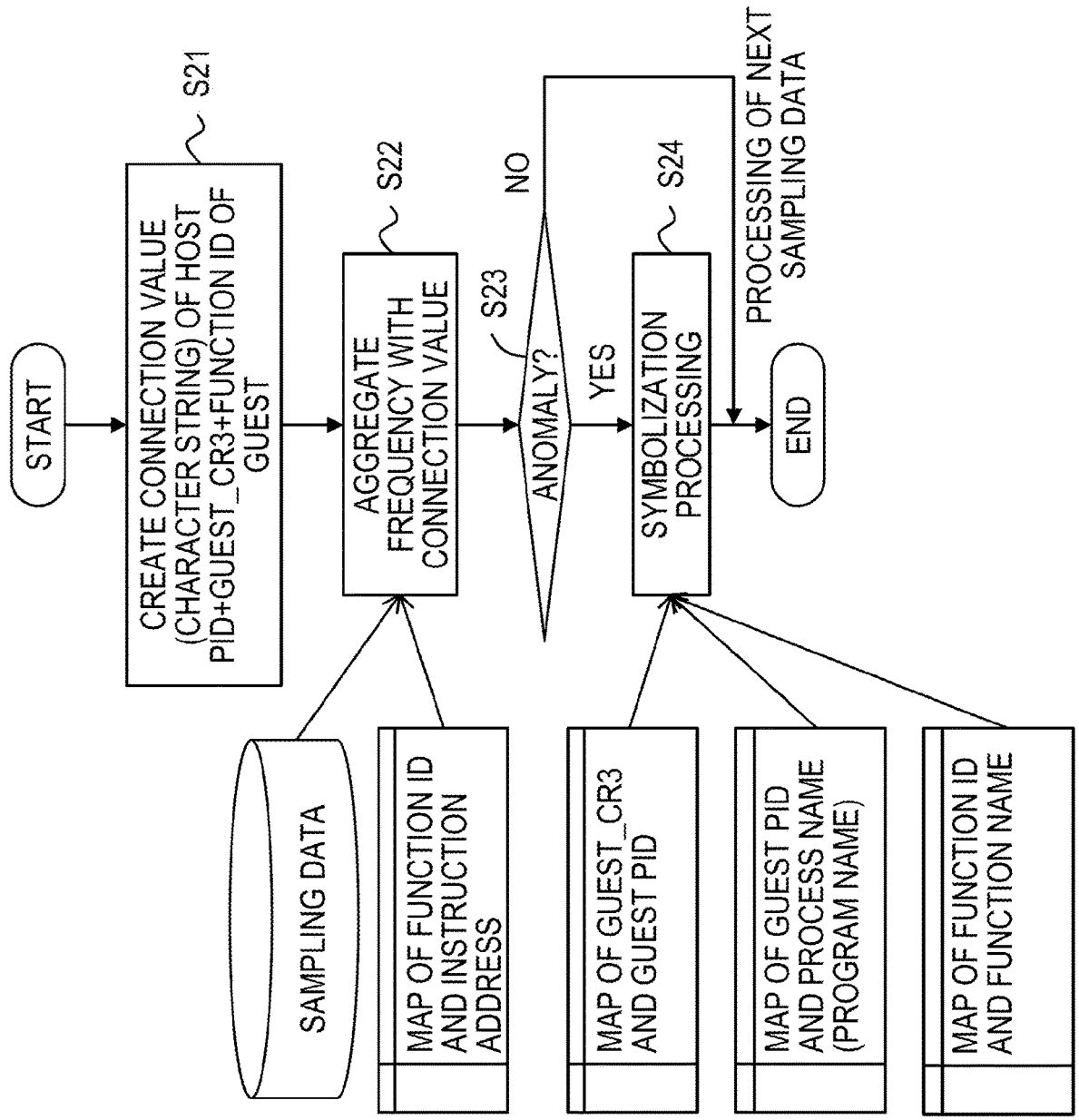
FIG. 10 is a flowchart illustrating processing of an analysis program in Processing Example 3.

FIG. 10 is a flowchart illustrating the processing of the analysis program in Processing Example 3. In Processing Example 3, the analysis program creates the connection value acquired by connecting the value of the Host PID, the value of the Guest_CR3, and the function ID (S21). The function ID is an ID for uniquely identifying the function in the program and may be the function name. The analysis program preserves a relationship between the function ID and the instruction address (head address) of the corresponding function as a map for uniquely identifying the function from the instruction address based on the memory map and the object file of the program in advance. Further, since the maps are sorted in the order of the instruction address, the instruction address at the end of each function is identified as the address immediately before the head address of the next function by one. The processing of S21 is an example of creating the key information.

Then, the analysis program aggregates the frequency of the sampling data with the connection value obtained in S21 (S22). In this case, the aggregation involves processing of associating the instruction address in the sampling data, that is, the program counter value of the virtual machine with the function ID. Therefore, the aggregation result is data indicating the occupation ratio of the CPU among a plurality of functions. That is, the analysis program associates the instruction address in the sampling data with the function ID based on the map of the function ID and the instruction address. The processing may be called a predetermined kind of symbol resolution. Therefore, Process Example 3 may be processing in which partial symbol resolution is incorporated at the time of analysis, with respect to Processing Example 2. The processing of S22 is an example of calculating the aggregation value of the key information.

Then, the controller machine 1 determines whether the anomaly occurs in the host machine 2, from the frequency aggregation result obtained in S22 by the anomaly detection engine (S23). The processing of S23 is an example of determining whether the aggregation value of the key information satisfies a predetermined condition.

Then, when it is determined that there is no anomaly, the analysis program executes analysis processing of the next sampling data. Meanwhile, when it is determined in S23 that the anomaly is detected, the analysis program outputs the processing result to, for example, the display of the controller machine 1 (S24). Further, the analysis program may convert the function ID into the function name and output the processing result to, for example, the display of the controller machine 1. In S23, the case where the anomaly is detected is an example of a case where the aggregation value of the key information satisfies a predetermined condition. The processing of S24 is an example of associating one or more identifiers or register values included in the key information with the name identifier defined in the program executed in the virtualization program or each of one or more virtual machines and outputting the corresponding identifiers or register values together with the aggregation value of the key information.

Effect of Embodiment

As described above, according to the embodiment, in the virtual machine environment, the controller machine 1 creates the connection value by using, for example, the PID of the process executed in the host machine 2, the CR3 on the virtual machine, and the instruction address of the virtual machine. The connection value may be the key information for identifying the user process of the virtual machine, the instruction address of the program executed in the virtual machine, or the function in the program executed in the virtual machine on the host machine 2. The controller machine 1 aggregates the sampling data acquired from the host machine 2 and the sampling data of the virtual machine acquired from the context saving area of the host machine 2 in the virtual machine environment with the connection value. Since the connection value is simply a combination value of, for example, the PID of the process, the CR3 on the virtual machine, and the instruction address of the virtual machine, the connection value may be created very easily. Further, the connection value is the user process on the virtual machine constructed on the host machine 2, the instruction address in the program executed by the user process, or a value (key information) for identifying the function. Therefore, in the processing of the embodiment, the controller machine 1 may aggregate the frequency information from the sampling data and perform anomaly determination by the anomaly detection engine without performing symbol resolution having a relatively large load.

In addition, when the anomaly is detected, the controller machine 1 may perform the symbol resolution and present the aggregated profile to the user together with symbols such as, for example, the virtual machine, the user process name, the program name, and the function name in the virtual environment.

Modification

In the embodiment, the controller machine 1 executes the analysis program, aggregates the sampling data using the connection value of the Host PID, Guest_CR3, and the instruction address of the virtual machine or the function ID as the key information, detects the anomaly, and executes the symbol resolution. However, such processing is not limited to the processing by the controller machine 1. For example, one of the virtual machines on the host machine 2 may execute the symbol resolution by aggregating the sampling data and detecting the anomaly. However, when one of the virtual machines aggregates the sampling data, detects the anomaly, and executes the symbol resolution, there is a possibility that the processing of the analysis program itself will affect the sampling data. That is, as clear from the configuration of FIG. 6, the reason is that the possibility that analysis of the collected sampling data and collection of next sampling data will be executed by the same host machine 2 increases.

«Computer-Readable Recording Medium»

A program for implementing any one of the functions described above in a computer, other machine, or an apparatus (hereinafter, referred to as a computer or the like) may be recorded in a recording medium readable by, for example, the computer. In addition, for example, by causing the computer to read and execute the program of the recording medium, the function thereof may be provided.

Herein, the recording medium readable by the computer or the like refers to a recording medium that accumulates information such as the data and the program by an electrical, magnetic, optical, mechanical, or chemical action and is readable by the computer or the like. Among the recording media, the recording media that may be detached from the computer include, for example, memory cards such as a flexible disk, a magneto-optical disk, a CD-ROM, a CD-R/W, a DVD, a Blu-ray disk, a DAT, an 8 mm tape, and a flash memory. Further, the recording media fixed to the computer include, for example, a hard disk and a read only memory (ROM). In addition, a solid state drive (SSD) may be used as both the recording media which may be detached from, for example, the computer and the recording media fixed to, for example, the computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus, comprising:
at least one first memory;
at least one first processor respectively coupled to the at least one first memory;
a second memory; and
a second processor coupled to the second memory,
the at least one first processor is configured to:
execute a virtualization program for activating one or more virtual machines on the at least one first processor in accordance with an instruction stored in the at least one first memory;
acquire operation information at a predetermined sampling cycle while executing a program in the one or more virtual machines; and
create key information for aggregating the operation information by connecting one or more identifiers included in the acquired operation information to register values included in the acquired operation information, and
the second processor is configured to:
calculate an aggregation value of the key information by aggregating the acquired operation information in accordance with the created key information; and
output, when the aggregation value of the key information satisfies a predetermined condition, the one or more identifiers or register values included in the key information in association with a name identifier defined in the virtualization program or the program executed in the one or more virtual machines together with the aggregation value of the key information.

2. The information processing apparatus according to claim 1, wherein the one or more identifiers or register values included in the operation information include identification information of a process at the time of activating the one or more virtual machines on the processor or a register value uniquely corresponding to the process on the one or more virtual machines.

3. An information processing method, comprising:
executing, by at least one first processor, a virtualization program for activating one or more virtual machines on the at least one first processor in accordance with an instruction stored in at least one first memory;
acquiring, by the at least one first processor, operation information at a predetermined sampling cycle while executing a program in the one or more virtual machines;
creating, by the at least one first processor, key information for aggregating the operation information by connecting one or more identifiers included in the acquired operation information to register values included in the acquired operation information;
calculating, by a second processor, an aggregation value of the key information by aggregating the acquired operation information in accordance with the created key information; and
outputting, by the second processor, when the aggregation value of the key information satisfies a predetermined condition, the one or more identifiers or register values included in the key information in association with a name identifier defined in the virtualization program or the program executed in the one or more virtual machines together with the aggregation value of the key information.

4. The information processing method according to claim 3, wherein the one or more identifiers or register values included in the operation information include identification information of a process at the time of activating the one or more virtual machines on the processor or a register value uniquely corresponding to the process on the one or more virtual machines.

5. A non-transitory computer-readable recording medium having stored therein a program that causes a computer to execute a process, the process comprising:
- executing a virtualization program for activating one or more virtual machines on the at least one first processor in accordance with an instruction stored in at least one first memory;
- acquiring operation information at a predetermined sampling cycle while executing a program in the one or more virtual machines;
- creating key information for aggregating the operation information by connecting one or more identifiers included in the acquired operation information to register values included in the acquired operation information;
- calculating an aggregation value of the key information by aggregating the acquired operation information in accordance with the created key information; and
- outputting, when the aggregation value of the key information satisfies a predetermined condition, the one or more identifiers or register values included in the key information in association with a name identifier defined in the virtualization program or the program executed in the one or more virtual machines together with the aggregation value of the key information.

6. The non-transitory computer-readable recording medium according to claim 5, wherein the one or more identifiers or register values included in the operation information include identification information of a process at the time of activating the one or more virtual machines on the processor or a register value uniquely corresponding to the process on the one or more virtual machines.

7. The information processing apparatus according to claim 1, wherein the at least one first processor is configured to acquire the operation information from an administration area that administrates a task created for each process in the virtual machine.

* * * * *